P. J. MARKS.
PHOTOGRAPHIC SHUTTER.
APPLICATION FILED SEPT. 14, 1911.
1,049,379.
Patented Jan. 7, 1913.
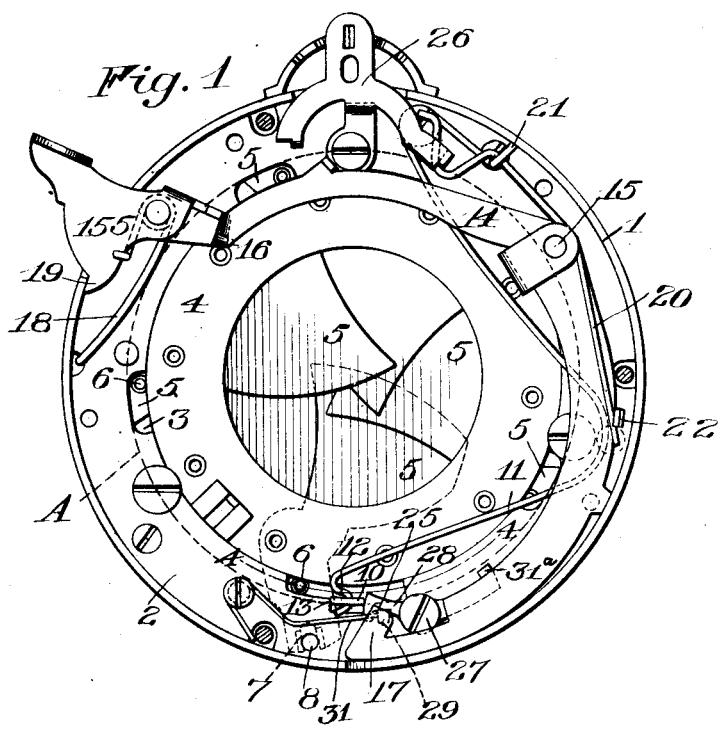
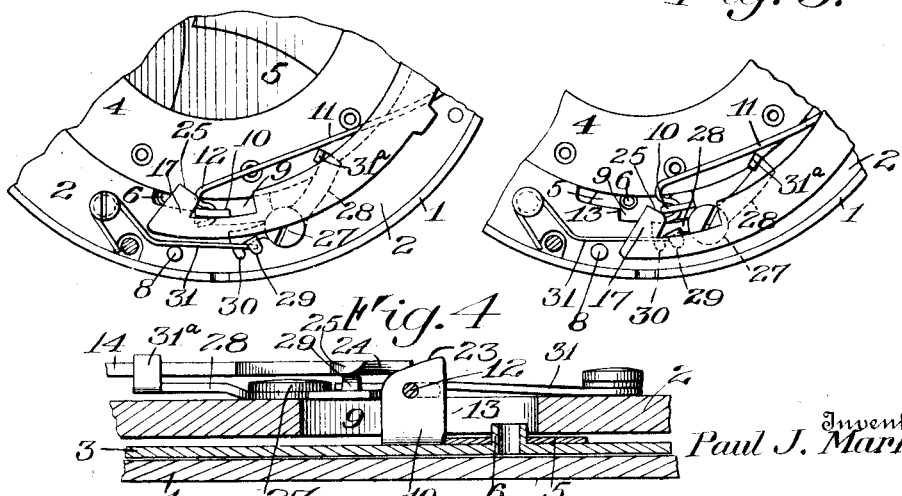
Witnesses
Walter B. Payne
Nelson H. Copp
Inventor
Paul J. Marks
By
his Attorneys

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,049,379.      Specification of Letters Patent.      Patented Jan. 7, 1913.

Application filed September 14, 1911. Serial No. 649,244.

*To all whom it may concern:*

Be it known that I, PAUL J. MARKS, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters of the automatic type and has for its object to provide simple and convenient means for automatically locking the shutter in its closed position whereby the blades are prevented from jarring open and causing fogging of the film or plate, and are also prevented from rebounding when actuated to closed position with the same effect.

A further object of the invention is to provide for the automatic release of such locking device coincidently with the operation of the parts whose movements cause the opening of the shutter.

To these and other ends the invention consists in certain improvements and combinations of parts all as will be hereinafter more fully described, the novel features being pointed out in the claims at the end of the specification.

In the drawings: Figure 1 is a front elevation of a shutter constructed in accordance with and illustrating one embodiment of my invention, the front portion of the casing or cover plate being removed and the parts being in their normal positions with the shutter closed; Fig. 2 is a similar view of a portion of the mechanism with the master member in set position and on the point of opening the shutter aperture; Fig. 3 is a view similar to Fig. 2 with the master member at the point of release for the closing of the shutter aperture, and Fig. 4 is an enlarged section taken substantially on the line 4—4 of Fig. 1.

Similar reference numerals throughout the several figures indicate the same parts.

The mechanism illustrated is an automatic shutter comprising a preferably cylindrical casing 1 containing a fixed or stationary supporting ring 2 and a relatively movable rotary ring 3 arranged in the present instance beneath the ring 2 and also beneath the diaphragm operating ring 4, the diaphragm being not further illustrated herein as it has nothing to do with the present invention. The inner circumference of the ring 3 is coincident with the inner circumference of the diaphragm ring 4 and its other circumference is indicated by the dotted line A. This ring 3 constitutes the annular actuator that causes the simultaneous operation of the shutter blades 5 that are pivoted at 6 to the actuator while their outer ends are bifurcated at 7 to form sliding bearings with secondary pivots 8 extending between the stationary ring 2 and the casing so that the movement of the actuator 3 in one direction opens the blades while its movement in the other closes them. The stationary ring 2 has a cut-away portion 9 on its inner circumference that, during these movements of the actuator, accommodates a projecting abutment 10 on the latter, and when the shutter is moved to closed position under the influence of a spring 11, which is connected to the abutment 10 by a hooked portion 12, the closing movement of the blades is limited by the engagement of the abutment 10 with the stop 13 at the end of the cut-away portion 9 against which it is held by the spring 11 in the normal condition of the shutter, as shown in Fig. 1.

The master member 14 is pivoted at 15 to the ring 2, or other stationary part, and has one arm operatively connected with the shutter operating member 155 at 16, while the other end is hooked to form a projection 17. The operating member 155 is provided with a spring 18 that holds it normally in raised position, as shown in Fig. 1, a stop 19 thereon engaging the casing, while a spring 20, secured at 21, and engaging a projection 22 on the master member, holds the latter normally both in engagement with the operating member 155 and out of the path of the abutment 10 on the actuator 3. When an instantaneous exposure is to be made, the operating member 155 is depressed causing the oscillation of the master member 14 and causing the projection 17 at one end thereof to move toward the abutment 10 on the actuator. The latter and the said projection 21 are provided, respectively, with coöperating cam faces 23 and 24 (Fig. 4) and, the master member being yieldable laterally, this allows the projection 17 to ride over the abutment 10 and hook in behind it, as shown in Fig. 2. This is as far as the master member moves in that direction, for at this point the operating member 155 slips from engagement therewith at 16 and releases it to be returned by its own spring 20. The said spring 20 is stronger than the spring motor 11 of the actuator 3 and, hence, as the master member returns to normal position, it rotates the actuator to the left and opens the shutter blades 5. But the actuator 3 and the master member are moving on different centers and the projection 17 is provided with another cam face 25 so that when the parts reach the position of Fig. 3 and the master member continues its movement, the abutment 10 on the actuator slides over this cam surface 25 and releases itself from the master member under the influence of its own spring motor 11 and returns to the first position closing the shutter blades.

Of course, the present shutter is provided with a controlling device, indicated generally at 26 by means of which the tensions of the spring motors are varied to alter the duration of the exposures and also to permit bulb and time exposures as well as instantaneous exposures, but this mechanism has nothing to do with the present invention and no detailed description is, therefore, necessary. Suffice it to say that the operation is the same with the bulb and time exposures, except that the master member 14 is halted in the position of Fig. 3 just before the abutment 10 on the actuator is released to continue under a subsequent impulse and thus allow the blades to remain open for a greater or less period.

In the practice of my present invention, as illustrated in this embodiment, I provide at a suitable point, to turn upon a fixed pivot 27, a latch member 28 that has two relatively laterally offset projections 29 and 30 between which engages the spring 31 that has a normal tendency to throw the latch into the path of movement of the abutment 10 on the actuator 3 and thus when the shutter blades are closed, as shown in Fig. 1, the said abutment 10 is held securely between its limiting stop 13 and the latch 28. However, during the initial or setting movement of the master member 14 in which its hooked projection 17 moves toward its coöperative relation with the abutment 10, it engages a projection 31ª on the other arm of the latch member 28 and operates the latter to move it out of engagement with the abutment 10, as shown in Fig. 2, so that by the time the master member is ready to move the actuator 3 to open the shutter, the latch 28 is well out of the way and cannot impede the movement of the abutment 10. Of course, the spring 31 of the latch is operating continuously to throw it back into the path of the abutment 10 but it can not do so until the latter reaches its limiting stop 13 on the return trip and the shutter is closed. In the mean time it happens to ride, in the present embodiment, successively against the hooked end 12 of the spring 11 and then the abutment 10 itself, but it engages instantly upon the return of the actuator, as shown in Fig. 1, and, therefore, no rebound is permitted the actuator or blade and no subsequent jarring of the shutter as a whole can effect the opening of the blades or any movement whatever thereof. The latch can only be released by the movement of the operating member 155 and of the master member 14 at the instant before the shutter is to be voluntarily opened in regular operation.

I claim as my invention:

1. In a shutter, the combination with a shutter blade and an actuator therefor, one of said parts being provided with an abutment, of a motor acting upon the actuator to normally close the shutter, a locking member movable to an operative position in the path of the abutment when the shutter is closed to retain the blade in that position and a master member acting against the actuator to open the shutter against the action of the motor and arranged to disengage the locking member from the abutment during its initial movement.

2. In a shutter, the combination with a shutter blade, and an actuator therefor, one of said parts being provided with an abutment, of means acting upon the actuator to normally close the shutter, a locking member movable to an operative position in the path of the abutment when the shutter is closed to retain the blade in that position, and a master member movable into and out of coöperation with the actuator to successively open the blade and then release the same, said master member being arranged to disengage the locking member from the abutment as it moves into coöperation with the actuator.

3. In a shutter, the combination with a shutter blade and an actuator therefor, one of said parts being provided with an abutment, of a spring acting upon the actuator to normally close the shutter, a locking member having an operative position in the path of the abutment when the shutter is closed to retain the blade in that position, and a master member, movable into and out of coöperation with the actuator to successively open the blade against the tension of the spring and then release the same, the locking member being connected for movement with the master member to be released thereby from the path of the abutment as the latter moves into coöperation with the actuator.

4. In a shutter, the combination with a blade and an actuator therefor, one of said parts being provided with a projecting abutment and a motor acting on the actuator to normally close the shutter, of a latch, a spring for moving the same into the path of the abutment on one side of the latter when the shutter is closed to retain the blade in that position, a master member movable into and out of coöperation with the abutment on the opposite side thereof to successively open the blade against the tension of the motor and then release the same, said master member and the abutment being provided with cam faces allowing one part to slide over the other during the setting movement of the master member, the latter being operatively connected to the latch to displace the latch from one side of the abutment as the master member moves into engagement with the other side during its setting movement.

PAUL J. MARKS.

Witnesses:
RUSSELL B. GRIFFITH,
FLORENCE E. FRANCK